(12) United States Patent
Miyanoiri

(10) Patent No.: US 8,451,049 B2  
(45) Date of Patent: May 28, 2013

(54) POWER SUPPLY SWITCHING CIRCUIT

(75) Inventor: Jun Miyanoiri, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/403,257

(22) Filed: Feb. 23, 2012

(65) Prior Publication Data

US 2012/0229172 A1 Sep. 13, 2012

(30) Foreign Application Priority Data

Mar. 9, 2011 (JP) .................................. 2011-051248

(51) Int. Cl.
*G11C 5/14* (2006.01)

(52) U.S. Cl.
USPC .............................. 327/530; 327/408; 307/80

(58) Field of Classification Search
USPC ................... 327/530, 407, 408; 307/80, 112
See application file for complete search history.

(56) References Cited

U.S. PATENT DOCUMENTS

| | | | | |
|---|---|---|---|---|
| 5,517,153 | A | * | 5/1996 | Yin et al. ...................... 327/546 |
| 7,696,645 | B2 | * | 4/2010 | Oelmaier ...................... 307/113 |
| 2008/0048500 | A1 | * | 2/2008 | Kihara et al. .................... 307/80 |
| 2010/0066431 | A1 | * | 3/2010 | Carter ........................... 327/408 |

FOREIGN PATENT DOCUMENTS

JP 2008-086100 A 4/2008

* cited by examiner

*Primary Examiner* — Quan Tra
(74) *Attorney, Agent, or Firm* — Brinks Hofer Gilson & Lione

(57) ABSTRACT

Provided is a power supply switching circuit with a smaller circuit scale. When a detector (11) detects that a voltage (V1) as an input power supply voltage is higher than a detection voltage (VDET), a control circuit (41) operates with a voltage (V4) output from a diode OR circuit (42), supplies a voltage (V2) as an input power supply voltage to a gate of a PMOS transistor (17), supplies a voltage (V3) to a gate of a PMOS transistor (18), and supplies a ground voltage to a gate of a PMOS transistor (19). Then, the PMOS transistors (17 and 18) are turned OFF and the PMOS transistor (19) is turned ON. In this case, the voltage V1 of a first terminal (T1) is output from a third terminal (T3) as the voltage (V3), which is an output power supply voltage.

4 Claims, 4 Drawing Sheets

POWER SUPPLY SWITCHING CIRCUIT

RELATED APPLICATIONS

This application claims priority under 35 U.S.C. §119 to Japanese Patent Application No. 2011-051248 filed on Mar. 9, 2011, the entire content of which is hereby incorporated by reference.

BACKGROUND OF THE INVENTION

1. Field of the Invention

The present invention relates to a power supply switching circuit.

2. Description of the Related Art

A conventional power supply switching circuit is described. FIG. 4 is a circuit diagram illustrating the conventional power supply switching circuit.

A detector 31 compares a voltage VCC and a voltage VBK and controls a selection circuit 33 based on a result of the comparison. Based on the result of the comparison, the selection circuit 33 selects higher one of the voltage VCC and the voltage VBK and supplies the selected voltage to the detector 31, a detector 32, and a switching circuit 34 as a voltage VCH.

The detector 32 compares the voltage VCC and a detection voltage VDET and controls the switching circuit 34 based on a result of the comparison. Specifically, if the voltage VCC is higher than the detection voltage VDET, the detector 32 outputs an output voltage of High level, and then the switching circuit 34 outputs the voltage VCC to respective output terminals of the detectors 31 and 32 and the power supply switching circuit as a voltage VOUT. If the voltage VCC is lower than the detection voltage VDET, on the other hand, the detector 32 outputs an output voltage of Low level, and then the switching circuit 34 outputs the voltage VBK to the respective output terminals of the detectors 31 and 32 and the power supply switching circuit as the voltage VOUT (see, for example, Japanese Patent Application Laid-open No. 2008-086100).

The conventional technology, however, uses the two detectors 31 and 32, and therefore the circuit scale of the power supply switching circuit increases.

SUMMARY OF THE INVENTION

The present invention has been made in view of the above-mentioned problem, and provides a power supply switching circuit with a smaller circuit scale.

In order to solve the above-mentioned problem, the present invention provides a power supply switching circuit, including: a first terminal to which a first voltage is input, a second terminal to which a second voltage is input, a third terminal to which a third voltage is output, and a fourth terminal from which a fourth voltage is output; a detector including an input terminal connected to the first terminal; a control circuit including an input terminal connected to an output terminal of the detector; a diode OR circuit including a first input terminal connected to the first terminal, a second input terminal connected to the second terminal, and an output terminal connected to the fourth terminal; a first MOS transistor which includes a gate connected to a first output terminal of the control circuit and is provided between the second terminal and the third terminal; a second MOS transistor which includes a gate connected to a second output terminal of the control circuit and is provided between the second terminal and the third terminal; and a third MOS transistor which includes a gate connected to a third output terminal of the control circuit and is provided between the first terminal and the third terminal, in which, when the detector detects that the first voltage is higher than a detection voltage, the control circuit operates with the fourth voltage output from the diode OR circuit, supplies a voltage which is equal to a source voltage and a back gate voltage of the first MOS transistor to the gate of the first MOS transistor, supplies a voltage which is equal to a source voltage and a back gate voltage of the second MOS transistor to the gate of the second MOS transistor, and supplies a voltage for turning ON the third MOS transistor to the gate of the third MOS transistor, and in which, when the detector detects that the first voltage is lower than the detection voltage, the control circuit supplies a voltage for turning ON the first MOS transistor to the gate of the first MOS transistor, supplies a voltage for turning ON the second MOS transistor to the gate of the second MOS transistor, and supplies a voltage which is equal to a source voltage and a back gate voltage of the third MOS transistor to the gate of the third MOS transistor.

According to the present invention, only one detector is used, and hence the circuit scale of the power supply switching circuit is small.

DETAILED DESCRIPTION OF THE PREFERRED EMBODIMENT

Hereinafter, an embodiment of the present invention is described with reference to the accompanying drawings.

Figure 1:
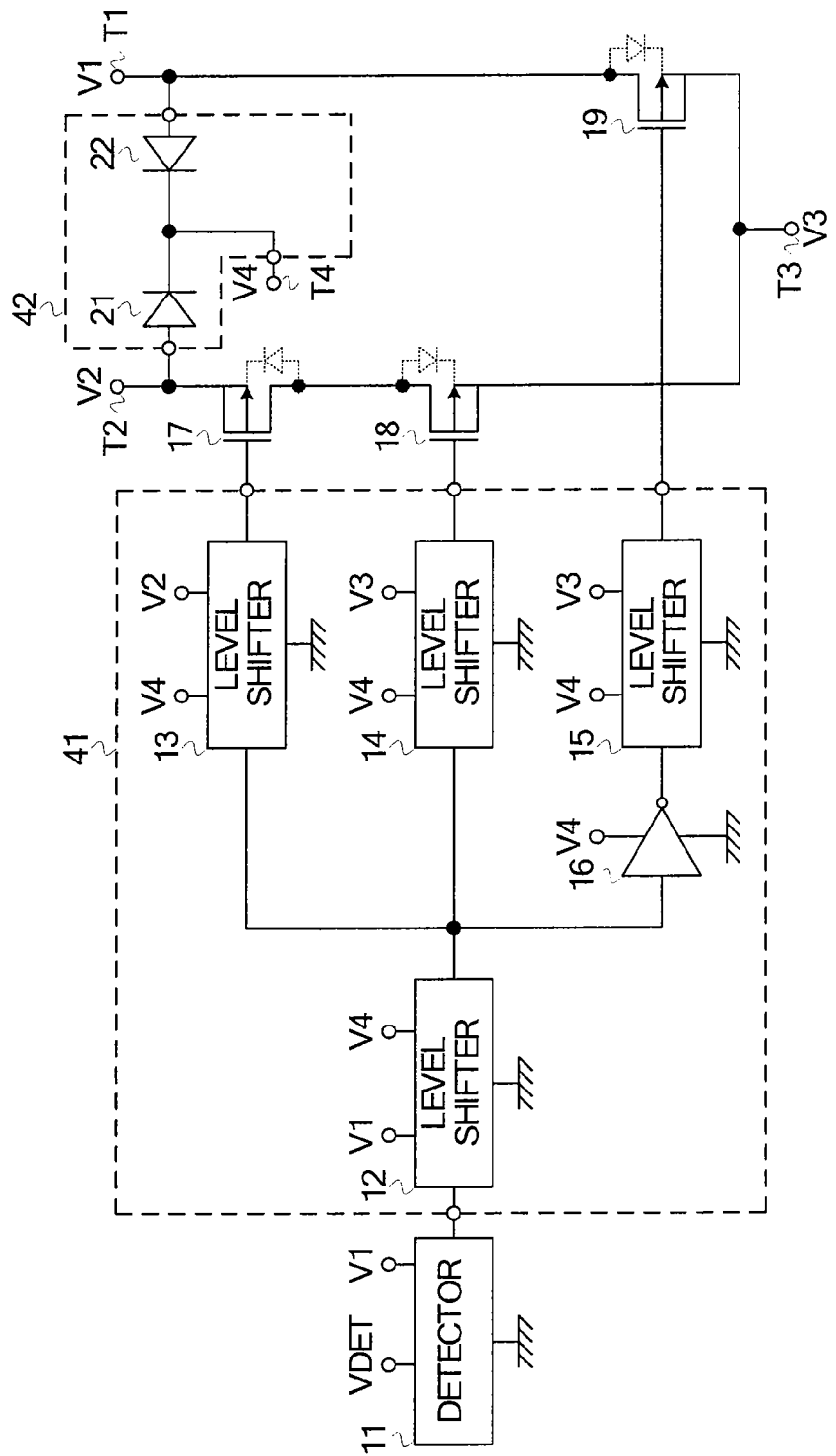
FIG. 1 is a circuit diagram illustrating a power supply switching circuit according to an embodiment of the present invention.

First, a configuration of a power supply switching circuit is described. FIG. 1 is a circuit diagram illustrating the power supply switching circuit according to the embodiment of the present invention.

The power supply switching circuit includes a detector 11, level shifters 12 to 15, an inverter 16, PMOS transistors 17 to 19, and diodes 21 and 22. The level shifters 12 to 15 and the inverter 16 together form a control circuit 41. The diodes 21 and 22 together form a diode OR circuit 42. The power supply switching circuit further includes a first terminal T1, a second terminal T2, a third terminal T3, and a fourth terminal T4.

The detector 11 has an input terminal connected to the first terminal T1. The level shifter 12 has an input terminal connected to an output terminal of the detector 11. The level shifter 12 has an output terminal connected to input terminals of the level shifters 13 and 14 and connected to an input terminal of the level shifter 15 via the inverter 16. In other words, the control circuit 41 has an input terminal connected to the output terminal of the detector 11.

The diode 21 has an anode connected to the second terminal T2 and a cathode connected to the fourth terminal T4. The diode 22 has an anode connected to the first terminal T1 and a cathode connected to the fourth terminal T4. In other words, the diode OR circuit 42 has a first input terminal connected to the first terminal T1, a second input terminal connected to the second terminal T2, and an output terminal connected to the fourth terminal T4.

The PMOS transistor 17 has a gate connected to an output terminal of the level shifter 13, a source and a back gate connected to the second terminal T2, and a drain connected to a drain of the PMOS transistor 18. The PMOS transistor 18 has a gate connected to an output terminal of the level shifter 14 and a source and a back gate connected to the third terminal T3. The PMOS transistor 19 has a gate connected to an output terminal of the level shifter 15, a source and a back gate connected to the third terminal T3, and a drain connected to the first terminal T1. In other words, the gates of the PMOS transistors 17 to 19 are connected to the first output terminal, the second output terminal, and the third output terminal of the control circuit 41, respectively.

The detector 11 and the level shifter 12 are each provided between the first terminal T1 (i.e., a power supply terminal for the detector 11 and an input side power supply terminal for the level shifter 12) and a ground terminal. The inverter 16 and the level shifters 13 to 15 are each provided between the fourth terminal T4 (i.e., a power supply terminal for the inverter 16 and input side power supply terminals of the level shifters 13 to 15) and the ground terminal. The fourth terminal T4 is connected to an output side power supply terminal of the level shifter 12. The second terminal T2 is connected to an output side power supply terminal of the level shifter 13. The third terminal T3 is connected to output side power supply terminals of the level shifters 14 and 15.

When the detector 11 detects that a voltage V1 as an input power supply voltage is higher than a detection voltage VDET, the control circuit 41 operates with a voltage V4 output from the diode OR circuit 42. The control circuit 41 then supplies a voltage V2 as an input power supply voltage to the gate of the PMOS transistor 17, supplies a voltage V3 to the gate of the PMOS transistor 18, and supplies a ground voltage to the gate of the PMOS transistor 19. Then, the PMOS transistors 17 and 18 are turned OFF and the PMOS transistor 19 is turned ON. In this case, the voltage V1 of the first terminal T1 is output from the third terminal T3 as the voltage V3, which is an output power supply voltage.

When the detector 11 detects that the voltage V1 as the input power supply voltage is lower than the detection voltage VDET, the control circuit 41 supplies the ground voltage to each of the gates of the PMOS transistors 17 and 18 and supplies the voltage V3 to the gate of the PMOS transistor 19. Then, the PMOS transistors 17 and 18 are turned ON and the PMOS transistor 19 is turned OFF. In this case, the voltage V2 of the second terminal T2 as the input power supply voltage is output from the third terminal T3 as the voltage V3, which is an output power supply voltage.

Next, the operation of the power supply switching circuit is described.

It is assumed that the diodes 21 and 22 each have voltage drop of 0.5 V. It is also assumed that the detection voltage VDET is 2.5 V. It is also assumed that the detector 11 outputs the voltage V1 when the voltage V1 is higher than the detection voltage VDET (2.5 V) and outputs the ground voltage (0 V) when the voltage V1 is lower than the detection voltage VDET.

(Operation when voltage V1 is higher than detection voltage VDET of detector 11) It is assumed that the voltage V1 as the input power supply voltage is 3.0 V and the voltage V2 as the input power supply voltage is 0 V. Because the voltage V1 is 3.0 V, the voltage V4 is 2.5 V due to the voltage drop caused by the diode 22.

Because the voltage V1 is 3.0 V, the detector 11 outputs the voltage V1 (3.0 V). Then, the level shifter 12 converts the voltage V1 to the voltage V4 and outputs the voltage V4 (2.5 V). The level shifter 13 converts the voltage V4 to the voltage V2 and outputs the voltage V2 (0 V). The level shifter 14 converts the voltage V4 to the voltage V3 and outputs the voltage V3. Further, the input voltage of the inverter 16 is at High level, and hence the inverter 16 outputs the ground voltage (0 V).

Then, a gate-source voltage of each of the PMOS transistors 17 and 18 becomes 0 V, and hence the PMOS transistors 17 and 18 are turned OFF, and the second terminal T2 and the third terminal T3 are electrically insulated from each other. In this case, the second terminal T2 and the third terminal T3 are electrically insulated from each other also by parasitic diodes of the PMOS transistors 17 and 18.

The output voltage of the inverter 16 is 0 V, and hence the output voltage of the level shifter 15 is also 0 V. Accordingly, the PMOS transistor 19 is turned ON, and hence the voltage V3 becomes equal to the voltage V1 (3.0 V). This voltage (V3=V1) is supplied to another circuit as a power supply voltage thereof. In other words, when the voltage V1 is higher than the detection voltage VDET of the detector 11, the voltage V1 of the first terminal T1 is output from the third terminal T3 as the voltage V3, which is an output power supply voltage.

(Operation when voltage V1 is lower than detection voltage VDET of detector 11) It is assumed that the voltage V1 as the input power supply voltage is 0 V and the voltage V2 as the input power supply voltage is 2.5 V. Because the voltage V2 is 2.5 V, the voltage V4 is 2.0 V due to the voltage drop caused by the diode 21.

Because the voltage V1 is 0 V, the detector 11 outputs the ground voltage (0 V). Then, the level shifter 12 also outputs the ground voltage (0 V), and hence the level shifters 13 and 14 also output the ground voltage (0 V). Further, the input voltage of the inverter 16 is at Low level, and hence the inverter 16 outputs the voltage V4 (2.0 V).

Then, the PMOS transistors 17 and 18 are turned ON, and hence the voltage V3 becomes equal to the voltage V2 (2.5 V). This voltage (V3=V2) is supplied to another circuit as a power supply voltage thereof. In other words, when the voltage V1 is lower than the detection voltage VDET of the detector 11, the voltage V2 of the second terminal T2 is output from the third terminal T3 as the voltage V3, which is an output power supply voltage.

The level shifter 15 converts the output voltage (2.0 V) of the inverter 16 to the voltage V3 (2.5 V). Accordingly, the gate voltage and the source voltage of the PMOS transistor 19 become the voltage V3, and the PMOS transistor 19 is turned OFF. Therefore, the first terminal T1 and the third terminal T3 are electrically insulated from each other. In this case, the first terminal T1 and the third terminal T3 are electrically insulated from each other also by a parasitic diode of the PMOS transistor 19.

The configuration described above uses only one detector 11, and hence the circuit scale of the power supply switching circuit is small.

Further, when the PMOS transistor 17 is to be turned OFF, the level shifter 13 sets the gate voltage of the PMOS transistor 17 to the voltage V2 and the source voltage thereof to the voltage V2, and hence the PMOS transistor 17 can be completely turned OFF. Due to the presence of the level shifter 14, the same applies to the PMOS transistor 18. Due to the presence of the level shifter 15, the same applies to the PMOS transistor 19.

In FIG. 1, the diodes 21 and 22 are used, but a diode-connected MOS transistor may be used.

In FIG. 1, the source and the back gate of the PMOS transistor 17 are connected to the second terminal T2, and the source and the back gate of the PMOS transistor 18 are connected to the third terminal T3. In this case, the level shifter 13 converts the voltage V4 to the voltage V2, and the level shifter 14 converts the voltage V4 to the voltage V3.

Figure 2:
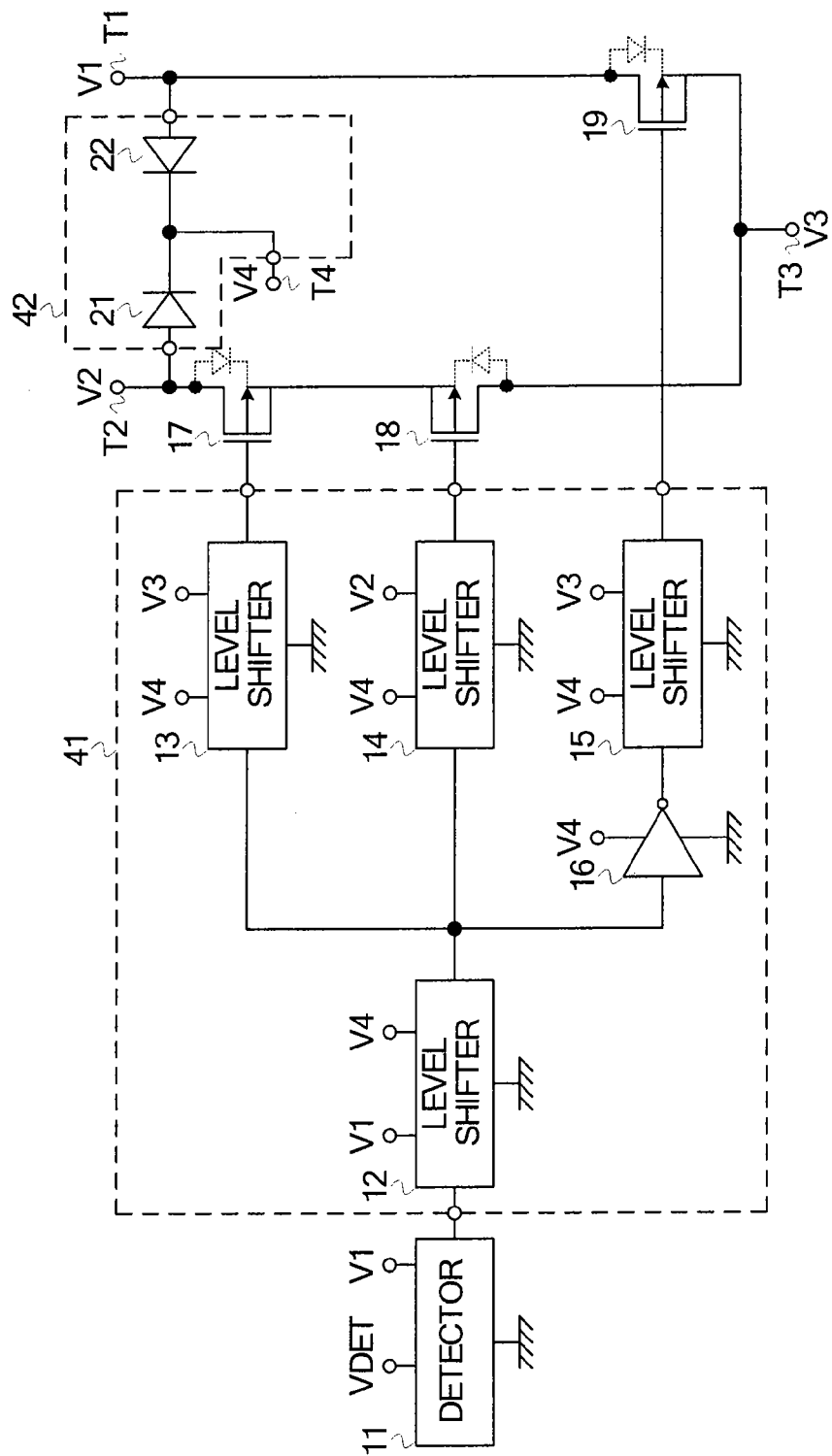
FIG. 2 is a circuit diagram illustrating another example of the power supply switching circuit according to the embodiment of the present invention.

However, as illustrated in FIG. 2, the source and the back gate of the PMOS transistor 17 may be connected to the source and the back gate of the PMOS transistor 18. In this case, the level shifter 13 converts the voltage V4 to the voltage V3 instead of the voltage V2, and the level shifter 14 converts the voltage V4 to the voltage V2 instead of the voltage V3.

Figure 3:
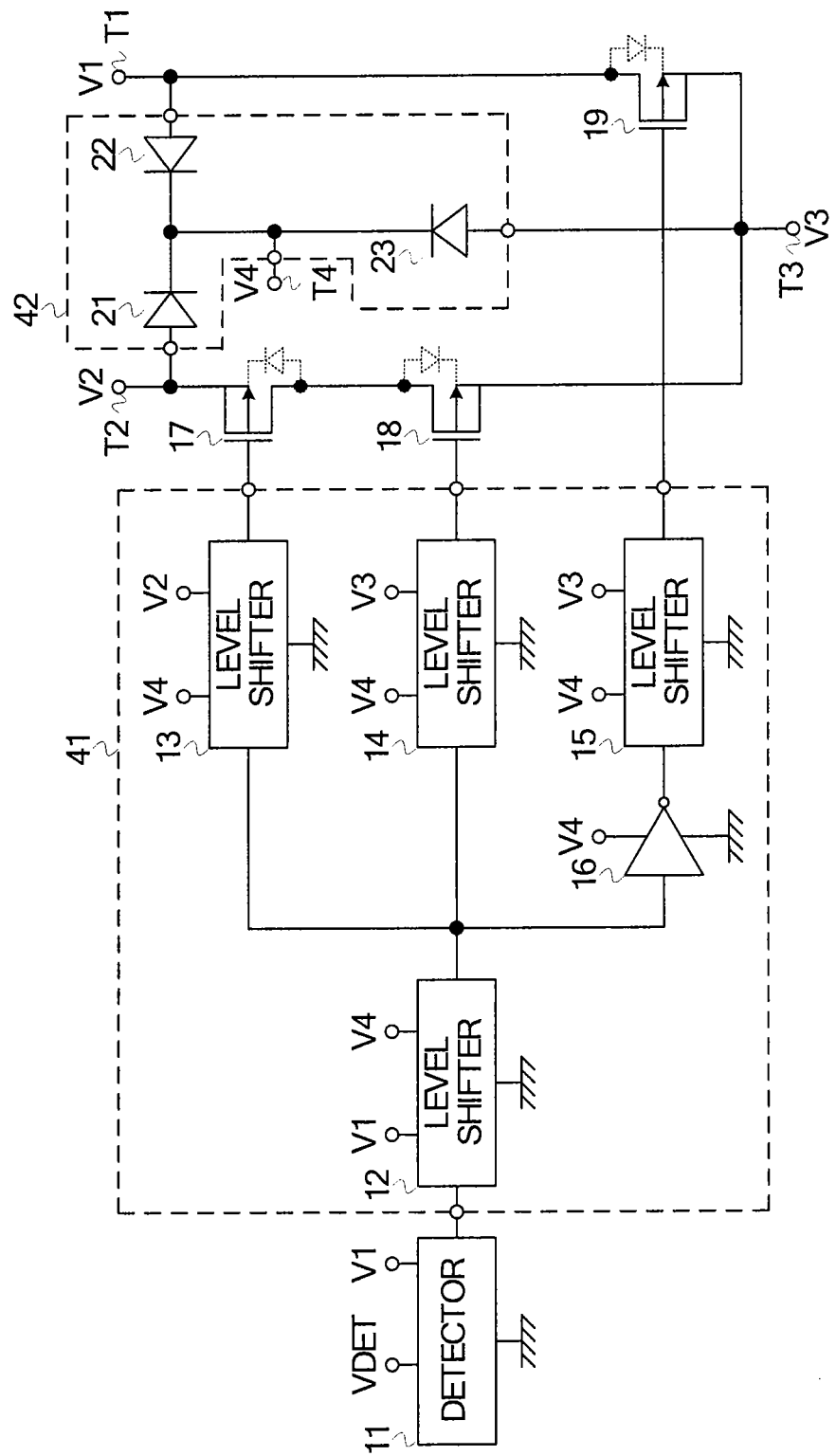
FIG. 3 is a circuit diagram illustrating still another example of the power supply switching circuit according to the embodiment of the present invention.
Figure 4:
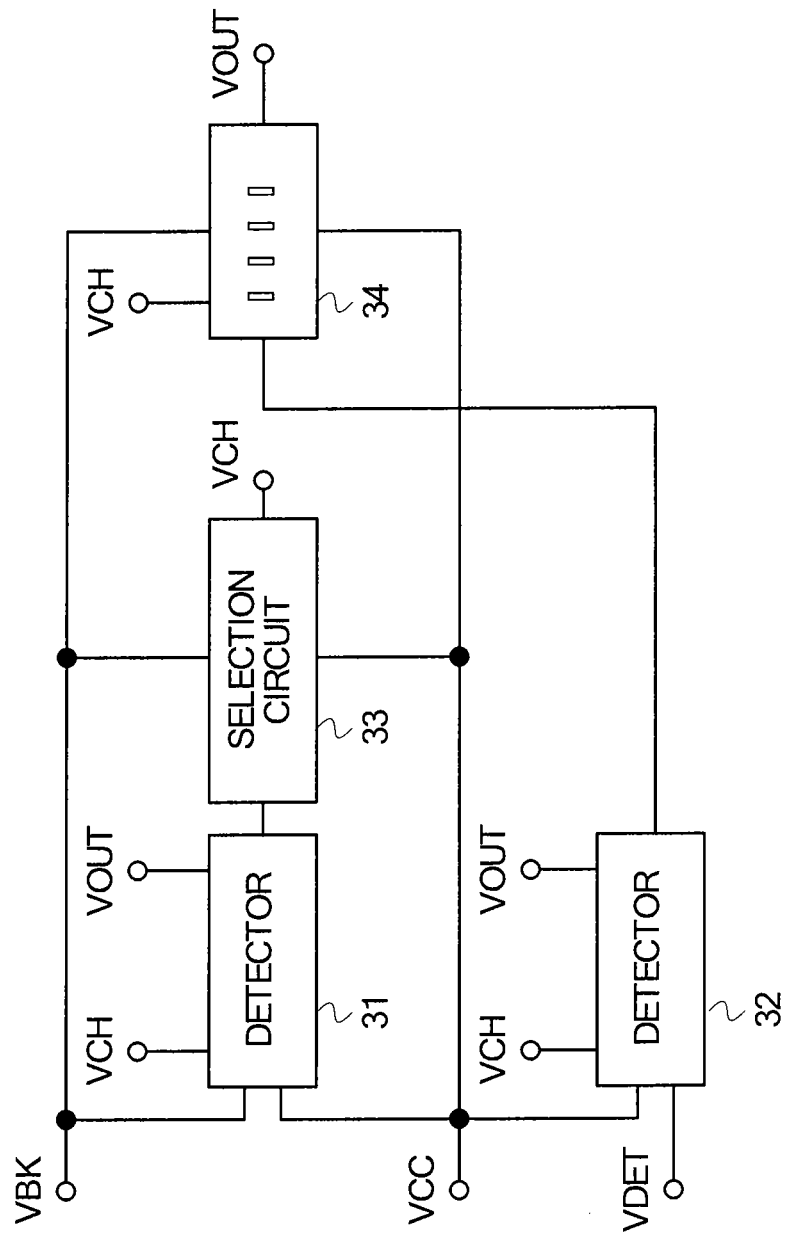
FIG. 4 is a circuit diagram illustrating a conventional power supply switching circuit.

As illustrated in FIG. 3, a diode 23 may be added. The diode 23 has an anode connected to the third terminal T3 and a cathode connected to the fourth terminal T4. In this case, even if no voltage is applied to the first terminal T1 nor the second terminal T2, as long as a voltage is applied to the third terminal T3, the voltage V4 based on the voltage V3 of the third terminal T3 can be output from the fourth terminal T4, and hence the operable state of the power supply switching circuit can be maintained.

Although not illustrated, the circuit designs of the level shifters 12 to 15 and the inverter 16 may be changed as appropriate. For example, the level shifters 12 and 13 may be formed of a single level shifter. The level shifters 12 and 14 may be formed of a single level shifter. The level shifters 12 and 15 may be formed of a single level shifter. The level shifters 14 and 15 may be formed of a single level shifter. The inverter 16 may be provided on the output side of the level shifter 15 rather than the input side.

What is claimed is:

1. A power supply switching circuit, comprising:
   a first terminal to which a first voltage is input, a second terminal to which a second voltage is input, a third terminal to which a third voltage is output, and a fourth terminal from which a fourth voltage is output;
   a detector including an input terminal connected to the first terminal;
   a control circuit including an input terminal connected to an output terminal of the detector;
   a diode OR circuit including a first input terminal connected to the first terminal, a second input terminal connected to the second terminal, and an output terminal connected to the fourth terminal;
   a first MOS transistor which includes a gate connected to a first output terminal of the control circuit and is provided between the second terminal and the third terminal;
   a second MOS transistor which includes a gate connected to a second output terminal of the control circuit and is provided between the second terminal and the third terminal; and
   a third MOS transistor which includes a gate connected to a third output terminal of the control circuit and is provided between the first terminal and the third terminal,
   wherein, when the detector detects that the first voltage is higher than a detection voltage, the control circuit operates with the fourth voltage output from the diode OR circuit, supplies a voltage which is equal to a source voltage and a back gate voltage of the first MOS transistor to the gate of the first MOS transistor, supplies a voltage which is equal to a source voltage and a back gate voltage of the second MOS transistor to the gate of the second MOS transistor, and supplies a voltage for turning ON the third MOS transistor to the gate of the third MOS transistor, and
   wherein, when the detector detects that the first voltage is lower than the detection voltage, the control circuit supplies a voltage for turning ON the first MOS transistor to the gate of the first MOS transistor, supplies a voltage for turning ON the second MOS transistor to the gate of the second MOS transistor, and supplies a voltage which is equal to a source voltage and a back gate voltage of the third MOS transistor to the gate of the third MOS transistor.

2. A power supply switching circuit according to claim 1, wherein the diode OR circuit further includes a third input terminal, the third input terminal being connected to the third terminal.

3. A power supply switching circuit according to claim 1, wherein the first MOS transistor includes a source and a back gate which are connected to the second terminal, and a drain connected to a drain of the second MOS transistor,
   wherein the second MOS transistor includes a source and a back gate which are connected to the third terminal, and
   wherein the third MOS transistor includes a source and a back gate which are connected to the third terminal, and a drain connected to the first terminal.

4. A power supply switching circuit according to claim 1, wherein the first MOS transistor includes a source and a back gate which are connected to a drain of the second MOS transistor, and a drain connected to the second terminal,
   wherein the drain of the second MOS transistor is connected to the third terminal, and
   wherein the third MOS transistor includes a source and a back gate which are connected to the first terminal, and a drain connected to the third terminal.

\* \* \* \* \*